United States Patent [19]

Peruglia et al.

[11] 3,874,745

[45] Apr. 1, 1975

[54] ANTI-SKID DEVICE FOR HYDRAULIC BRAKE MECHANISMS

[75] Inventors: Marco Peruglia; Giuseppe Amedei, both of Turin; Antonino Bertone, Sant Antonino; Giulio Dotti, Turin, all of Italy

[73] Assignee: Fiat Societe per Azioni, Turin, Italy

[22] Filed: May 9, 1974

[21] Appl. No.: 468,601

[30] Foreign Application Priority Data
May 15, 1973 Italy .................................. 68388/73

[52] U.S. Cl. .................. 303/21 F, 60/547, 303/6 R, 303/10
[51] Int. Cl. ............................................. B60t 8/02
[58] Field of Search ............. 60/547, 548, 565, 566; 188/345, 181 A; 303/6 R, 6 C, 10, 21 FM, 21 FP, 21 SV

[56] References Cited
UNITED STATES PATENTS

| | | | |
|---|---|---|---|
| 3,588,191 | 6/1971 | Atkin | 303/21 FP |
| 3,666,328 | 5/1972 | Williams | 303/10 |
| 3,799,300 | 3/1974 | Cochrane et al. | 60/547 |

*Primary Examiner*—Duane A. Reger
*Attorney, Agent, or Firm*—Sughrue, Rothwell, Mion, Zinn & Macpeak

[57] ABSTRACT

A hydraulic braking system has a master cylinder with two pistons linked by a spring and separating the cylinder into two working chambers, one of which is connected via a distributor valve to the brake cylinders and the other of which is connected in a pump circuit which directly feeds one control port of the distributor valve and feeds indirectly, via an anti-skid control valve, a second control port of the distributor valve. The braking circuit is arranged to provide anti-skid braking and also to operate at least some of the brakes even in the event of a pump failure or a rupture in the pump circuit.

5 Claims, 1 Drawing Figure

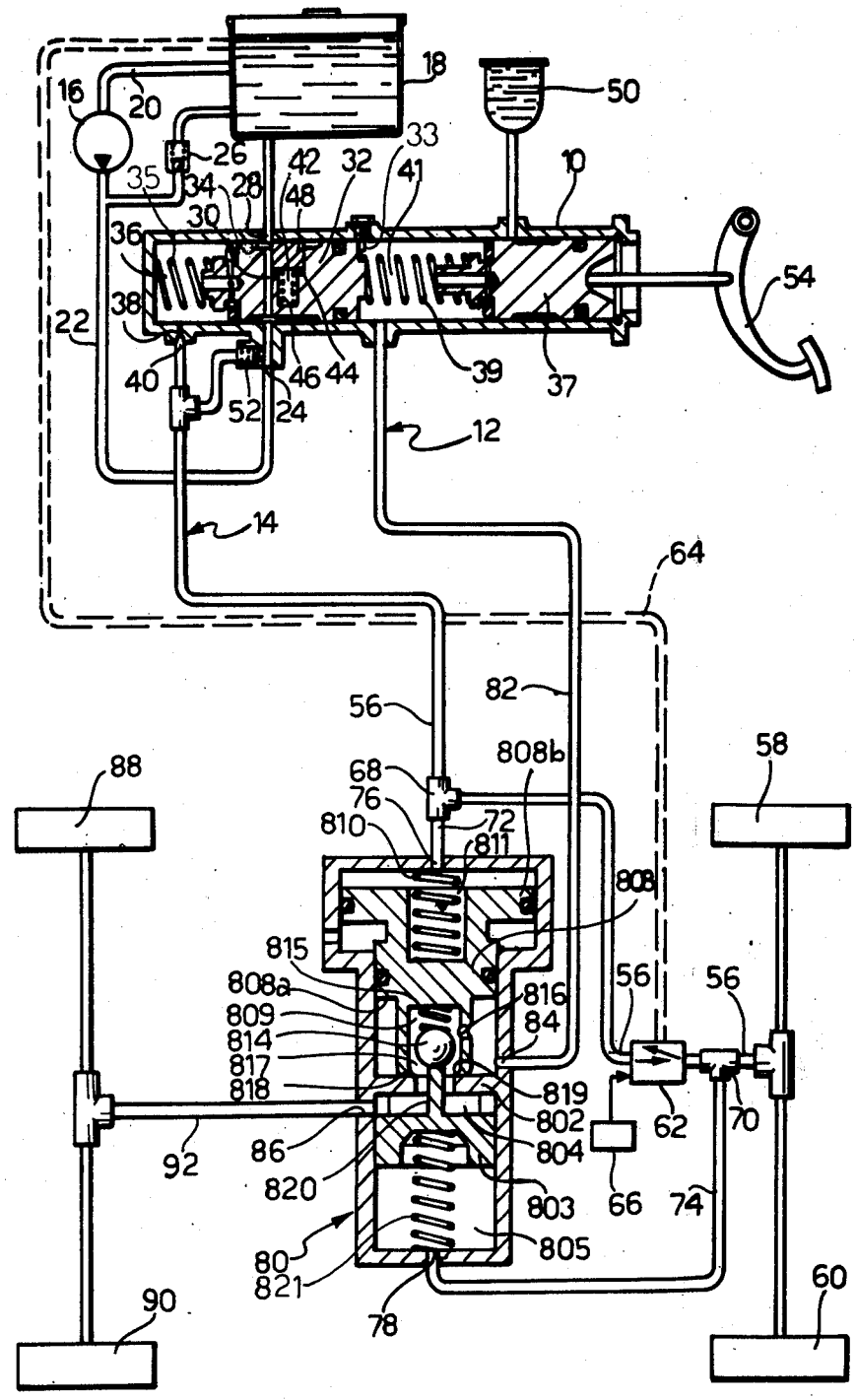

ANTI-SKID DEVICE FOR HYDRAULIC BRAKE MECHANISMS

BACKGROUND AND OBJECTS OF THE INVENTION

The present invention relates to a hydraulic brake system and particularly to a system having an anti-skid device, which is particularly suitable for small or medium sized motor vehicles.

Many different types of braking systems having anti-skid devices for different axles of a vehicle are known.

It is a primary object of the present invention to provide a power assisted braking system which also has an anti-skid mechanism with a single device for modulating the pressure on the brakes of both the front and rear wheels of the vehicle when an incipient skid state is sensed by a device sensitive to the dynamic state of the wheels.

Another object of the invention is to provide a power assisted braking system which allows braking even in the case of failure of the power assistance circuit.

SUMMARY OF THE INVENTION

According to one aspect of the present invention there is provided a hydraulic braking system for a motor vehicle of the type comprising: at least one brake cylinder connected to a wheel of the motor vehicle, a hydralic fluid reservoir, a pump connected to the reservoir to draw fluid therefrom, fluid control means connected downstream of said pump to receive fluid therefrom, means connecting said fluid control means to said reservoir, first fluid conduit means connecting a circuit point between said pump and said fluid control means to said brake cylinder, wherein the improvement consists in said fluid control means comprising: a master cylinder closed at one end, a first port in said master cylinder connected to the output end of said pump, a second port in said master cylinder connected to said fluid reservoir, stop means projecting into said master cylinder, a first piston slidable within said master cylinder, said first piston having a passage interconnecting said first and second ports in said master cylinder when said first piston is in a rest position abutting against said stop means, restrictor throttle means in said first piston, said restrictor throttle interconnecting said first and second ports when said piston is moved out of said rest position towards said closed end of said master cylinder, thereby causing a restricition of the communication between said first and second ports, a first compression spring between said closed end of said master cylinder and said first piston, urging said first piston to abut against said stop means; a second piston slidable within said master cylinder on the opposite side of said stop means from said first piston, and means linking said first piston to a brake pedal operable to urge said second piston towards said first piston, and a second compression spring between said first and second pistons.

The invention is also characterised in that into the main pipe there is connected an anti-skid control device designed to release the pressure from the brake cylinder when the wheel associated with this brake cylinder is in an incipient skidding situation.

Further features and advantages of the present invention will become apparent during the course of the following description with reference to the accompanying drawing, which is provided purely by way of non-restrictive example. The single FIGURE of the accompanying drawing is a schematic diagram of the hydraulic circuit of a preferred embodiment of a braking system according to the invention.

DESCRIPTION OF THE PREFERRED EMBODIMENT

In the drawing is shown a master cylinder 10 which supplies braking pressure to a braking circuit, generally indicated 12, in the normal manner upon depression of a brake pedal 54. The cylinder also supplies pressure, upon depression of the brake pedal 54, to a circuit 14 by means of a volumetric pump 16 operated by the engine of the vehicle (not illustrated). The pump 16 draws hydraulic fluid from a reservoir 18 via a pipe 20, and pumps it through a pipe 22 to a first port 24 in the side wall of the master cylinder 10. Within the master cylinder 10 there is a first piston 32 which is urged towards a rest position, abutting a stop 33 which projects into the cylinder from the side wall thereof, by a spring 35 housed in a rear chamber 36 of the cylinder between the piston 32 and a closed end of the cylinder. A second port 28 in the side wall of the master cylinder 10 is located diametrically opposite the first port 24. The first piston 32 has a transverse passage 30 which, when the first piston 32 is in the rest position permits a free communiction between the first and second ports. Longitudinal ports 34 in the first piston 32 allow communication between the passage 30 and the rear chamber 36 which has a constricted or throttled passage 38 which communicates with an outlet port 40. A unidirectional valve 52 connects the inlet port 24 with a conduit leading directly to the outlet port 40 at a point downstream of the throttle restrictor 38. The valve 52 permits fluid flow from the inlet port 24 directly to the outlet port 40, bypassing the master cylinder 10 when the pressure difference between the two ports 24 and 40 exceeds a certain minimum value, and prevents fluid flow in the reverse direction. The first piston 32 also has a diametrical hole 42 provided with a shoulder defining a narrow part housing one end of a compression spring 46 which presses a small block 48 sliding within the hole 42 against the wall of the master cylinder 10.

A second piston 37 is slidable within the master cylinder 10 under the opposing forces of a brake pedal 54 and a spring 39 located between the first piston 32 and the second piston 37. Between the first and second pistons there is thus defined a chamber 41 of variable volume. An opening in the side wall of the master cylinder 10 permits the chamber 41 to communicate with the pipe 12. A further reservoir 50 is connected to the chamber 41 to maintain the volume of fluid therein, in a known manner, via a throttled space between the piston 37 and the wall of the master cylinder 10.

The circuit 14 is connected via a pipe 56 to a T-junction 68 which connects the pipe 56, via a pipe 72, to a first control port 76 of a repeater valve 80 and to an anti-skid control valve 62 which is connected to a further T-junction 70 leading, via an extension of the pipe 56, to the brakes of rear wheels 58 and 60, and via a pipe 74 to a second control port 78 of the repeater valve 80. the anti-skid control valve is connected to the reservoir 18 by a discharge pipe 64, and is controlled by a small central control device 66 of known type which causes the valve 62 to connect the T-junction 70 to the pipe 64 when an incipient skid state of one of the wheels 58, 60 is sensed, thereby releasing the braking pressure at the brakes of the near wheels 58, 60, and lowering the pressure at the control port 78 of the repeater valve 80.

The circuit generally indicated 12 includes a pipe 82 connected to an inlet port 84 of the repeater valve 80 which has an outlet port 86 which is connected to the brakes of front wheels 88, 90, by means of a pipe 92.

The body of the repeater valve 80 is cylindrical, and it is separated into two compartments by an intermediate wall 802 having a central opening therein; in the lower compartment there is housed a piston 803, which separates the lower compartment into a first chamber 804 connected to the outlet port 86 and a second chamber 805 connected to the second control port 78. The piston 803 has an upstanding projection 820 and is biased toward the intermediate wall 802 by a spring 821 so as to adopt a position adjacent the wall 802 with the projection 820 extending through the opening therein. In the upper compartment there is housed a freely movable slide 808 having an upper part 808b of larger diameter and a lower part 808a of smaller diameter. Within the smaller lower part 808a there is a cavity 809 and in the side wall thereof there is a transfer port 816. The lower part 808a of the slide has a rim 818 defining a lower mouth 817 of the cavity 809, which abuts the intermediate wall 802 of the body of the repeater valve to allow fluid contained in the chamber 809 to flow through the central opening in the wall 802 so that communication is established between the upper chamber 804 of the lower compartment and the part of the upper compartment housing the lower part of the slide 808 via the port 816, even when the mouth 817 is pressed against the wall 802. In the cavity 809 there is housed a ball valve 814 which is urged downwardly by a compression spring 815 and is retained within the cavity by an inwardly turned lip 819 on the rim defining the mouth 817.

The upper part 808a of the slide 808 has an upper face defining, with the walls of the upper compartment of the repeater valve 80, an upper chamber 811; a second helical spring 810 is housed in a cavity in the upper face of the slide and acts between the slide 808 and the upper wall of the body of the repeater valve 80 to urge the slide 808 downwardly against the intermediate wall 802. The upper chamber 811 communicates with the first control port 76. When the slide 808 is in the lower postion, to which it is biased by the spring 810 and the piston 803 is in the upper position, to which it is biased by the spring 821 in the lower chamber 805, the projection 820 on the piston 803 raises the ball 814 thus allowing free passage of fluid from the inlet port 84 to the outlet port 86.

OPERATION a. Normal braking:

Assuming the engine is operating, and thus the pump 16 is working, upon depression of the brake pedal, the second piston 37 is moved to the left of the drawing by the brake pedal 54 and the first piston 32 is thrust to the left by the spring 39. This causes the flow of fluid in the pipe 22 to be restricted by the block 48 obstructing the port 28. Thus the fluid pressure at the inlet port 24 is increased, and this increased pressure is passed through the valve 52 to the pipe 14.

The increase in fluid pressure passes through the T-junctions 68 and 70 to reach the control ports 76 and 78 of the repeater valve 80. The slide 808 is thus held down and the piston 803 is held up so that the rod 820 raises the ball 814 to open the mouth 817 and maintain communication between the inlet and outlet ports 84, 86 respectively, of the valve 80. At the same time the front brake circuit 12 experiences an increase in fluid pressure due to the compression of the chamber 41 of the master cylinder 10 by the movement of the pistons 37 and 32, the movement of the former being greater than that of the latter. This increase in fluid pressure passes through the inlet port 84, the transfer port 816, the mouth 817, and the outlet port 86 of the valve 80 and thence supplies the front brake cylinders.

When the brake pedal 54 is released the pistons 32 and 37 return immediately to their respective rest positions and the pressure is released freely from the circuit 12 of the front brakes. The pressure in the circut 14 of the rear brakes is released, through the throttled port 38, into the chamber 36 through the passages 34 and then the port 28 more slowly due to the restrictor throttles 38 and 34, thus ensuring that the front brakes are released first.

b. Braking with intervention of the anti-skid device:

In this case, the application of braking pressure to the front and rear brakes commences normally, as described in the preceding paragraph, until the central control device 66 detects an incipient skid situation whereupon it acts to commute the controlled valve 62 to a position connecting the T-junction point 70 and the pipe 56 connecting the T-junction to the brake cylinder of the rear brakes, to the discharge pipe 64. The pressure in the rear brakes 58 and 60 is thus immediately released, through the discharge pipe 64, to the reservoir 18. The pressure in the pipe 74 interconnecting the T-junction 70 and the lower control port 78 of the repeater valve 80 is also lowered by the connection of the valve 62 to the discharge pipe 64 thus allowing the piston 803 to move downwardly into the lower chamber 805, lowering the ball valve 814 to close this and prevent further pressure from the braking circuit 12 from entering via the mouth 817 through the aperture in the intemediate wall 802 into the upper chamber 804 of the lower compartment of the valve body 80. The release of pressure in the lower chamber 805 of the lower compartment of the valve body 80 causes a predetermined drop in pressure at the brake cylinders 88, 90 due to the fact that fluid in the pipe 92 and in the brake cylinders 88, 90 flows into the upper chamber 804 of the lower compartment of the valve body 80 to equalise the pressure exerted on the piston 803 by the compression spring in the lower chamber 805. The valve 62 maintains the pipe 56 between the T-junction 68 and itself closed so that the pressure in this pipe remains at the pressure determined by the pump 16, thereby maintaining the pressure in the upper chamber 811 above the slide 808 at the normal operating pressure. This, because of the greater surface area in the upper chamber of the upper compartment than in the lower chamber of the upper compartment of the valve body 80, ensures that the slide 808 is held in the position with the mouth 817 of the cavity 809 pressed down onto the upper face of the intermediate wall 802 thereby ensuring that the ball valve 814 remains securely closed isolating the brake cylinders 88, 90 from the source of pressure in the circuit 12. The pressure in the rear brakes 58, 60 is thus entirely released and the pressure in the front brakes 88, 90 is partially released, when an incipient skidding situation is sensed, to allow the wheels associated with these brakes to turn thereby avoiding the skidding situation which was imminent. When the speed of the wheels is such that the skidding situation is safely passed, the control device 66 produces a signal to commute the valve 62 back to its original position interconnecting pipe 56 between the T-junction 68 and the valve 62 to the T-junction 70 and that branch of the pipe 56 between the T-junction 70 and the rear brake cylinders 58 and 60. The pressure in the rear brake cylinders thus increases, assuming that the brake pedal 54 remains depressed, and the pressure in the pipe 74 leading to the lower inlet port 78 of the valve 80 also increases thereby urging the piston 803 upwardly to reapply braking pressure to the rear brake cylinders 88, 90 via the pipe 92. As the piston 803 reaches the upper part of the lower compartment of the repeater valve 80 the projection 820 extending upwardly therefrom lifts the ball valve 814 re-establishing communication between the pipe 82 of the braking circuit 12, via the inlet port 84, the transfer port 816, the mouth 817 of the cavity 809, the opening in the intermediate wall 802, the upper chamber of the lower compartment of the valve body 80, the outlet port 86, and the brake pipe 92 leading to the front brake cylinders 88 and 90. The front brakes are thus also reapplied and braking continues normally unless a further incipient skidding situation develops in which case the above decribed process is repeated. If, before the control device 66 re-establishes communication between the two parts of the pipe 56, closing the discharge pipe 64, the brake pedal 54 is released, the residual braking pressure in the front brake cylinders 88, 90 can flow through the brake pipe 92, via the ball valve 814, through the transfer port 816 and into the pipe 82 of the front braking circuit 12 as the pressure in the chamber 41 of the master cylinder 10 is lowered below that in the brake cylinders 88, 90.

c. Braking upon failure of the pump circuit:

If the volumetric pump 16 fails to operate either through failure of the pump 16 itself or because the vehicle's engine is not turning, when the brakes are applied by depression of the brake pedal 54, the chamber 36, through the port 38, supplies fluid under pressure to the rear brake cylinders 58, 60, albeit at a lower pressure than normal, while the fluid pressure in the chamber 41 of the master cylinder 10 is applied to the front brake cylinders 88, 90 through the repeater valve 80 in the normal way. The ball valve 814 is open, in this situation, by virtue of the fact that the slide 808 has a greater pressure applied to the lower face than to the upper, due to the reduced pressure in the circuit 14 from the chamber 36. The slide 808 is thus raised holding the ball 814 away from the opening in the intermediate wall 802 by the inner lip 819 of the mouth of the cavity 809.

d. Braking on failure of the entire pump circuit:

If there is a failure such as a rupture of the pipe 56 or a leakage from the chamber 36, no pressure reaches the inlet of the anti-skid control valve 62. In this case the pressure at the front brakes is normal, through the circuit 12 and, in the absence of pressure at the port 78, the piston 803 is thrust downwards by the pressure of the circuit 12 thereby causing a fluid pressure in the pipe 74, which pressure is applied to the rear brakes, excluding the anti-skid control.

The difference in the diameters of the upper and lower parts 808a and 808b of the slide 808 of the repeater valve 80 also acts to prevent the slide 808 of the repeater valve 80 from moving upwards when the piston 37 has reached the end of its travel under maximum braking conditions This is due to the fact that the slide 808 of the valve 80 experiences a resultant thrust tending to hold it down at its lowermost position abutting the intermediate wall 802 when there is sudden braking because the area of the upper face is larger than the area of the lower face. For example, if the difference in areas has a ratio of 2:1, the slide 808 will only be moved from its position abutting the intermediate wall 802 when the pressure in the chamber 41 has reached a value twice that of the maximum pressure in the circuit 14 due to the operation of the pump 16.

The throttle 38 between the chamber 36 and the circuit 14, together with the one-way valve 52, serve the purpose of damping the reactions on the brake pedal 54 upon operation of the anti-skid device 62, 66.

What is claimed is:

1. A hydraulic braking system for a motor vehicle, of the type comprising:
    at least one brake cylinder connected to a wheel of a first axle of said motor vehicle,
    a hydraulic fluid reservoir,
    a pump connected to the reservoir to draw fluid thereform,
    fluid control means connected downstream of said pump to receive fluid therefrom,
    means connecting said fluid control means to said reservoir,
    first fluid conduit means connecting a circuit point between said pump and said fluid control means to said brake cylinder, wherein the improvement consists in said fluid control means including:
    a master cylinder closed at one end,
    a first port in said master cylinder connected to the output end of said pump,
    a second port in said master cylinder connected to said fluid reservoir,
    stop means projecting into said master cylinder,
    a first piston slidable within said master cylinder, said first piston having a passage interconnecting said first and second ports in said master cylindner when said first piston is in a rest position abutting against said stop means,
    restrictor throttle means in said first piston, said restrictor throttle interconnecting said first and second ports when said piston is moved out of said rest position towards said one end of said master cylinder, thereby causing a restriction of the communication between said first and second ports,
    a first compression spring between said closed end of said master cylinder and said first piston, urging said first piston to abut against said stop means;
    a second piston slidable within said master cylinder on the opposite side of said stop means from said first piston, means linking said first piston to a brake pedal operable to urge said second piston towards said first piston, and a second compression spring between said first and second pistons.

2. The hydraulic braking system of claim 1, wherein there are means defining a first chamber in said master cylinder, between said first piston and said one end of said master cylinder, and
    means defining a fluid transfer port, having a restrictor throtle therein, between said first chamber and a main conduit interconnecting said chamber and said at least one brake cylinder.

3. The hydraulic braking system of claim 2, wherein a one-way valve is connectd between said main conduit and said first port of said master cylinder and, said first chamber defined between said first piston and said one end of said master cylinder communicates with said second port in said master cylinder.

4. The hydraulic braking system of claim 2 wherein an anti-skid control device is connected in said main conduit, said anti-skid control device operating to release the braking pressure in said brake cylinder when the wheel associated with said brake cylinder is in an incipient skidding condition.

5. The hydraulic braking system of claiam 4, wherein a repeater valve is connected to at least one further brake cylinder of a wheel of a second axle of said motor vehicle, said repeater valve having:

an inlet port, means connecting said inlet port to a second chamber in said master cylinder, said second chamber being defined between said first and second pistons of said master cylinder, an outlet port, means connecting said outlet port to said further brake cylinder, a first control port, means connecting said first control port to a point of said main conduit upstream of said anti-skid control device, a second control port, means connecting said second control port to a point of said main conduit downstream of said anti-skid control device, and said repeater valve operating to allow free communication between said inlet port and said outlet port for the flow of fluid therethrough when the fluid pressure at said first and second control ports is of similar magnitude, and operating to interrupt communication between said inlet and outlet ports when the pressure at said second control port falls to zero while the pressure at said first control port remains at a higher level.

* * * * *